Jan. 15, 1957  E. S. THOMPSON  2,777,267
STALK AND ROOT PULLER AND SHREDDER
Filed Dec. 7, 1953  5 Sheets-Sheet 5
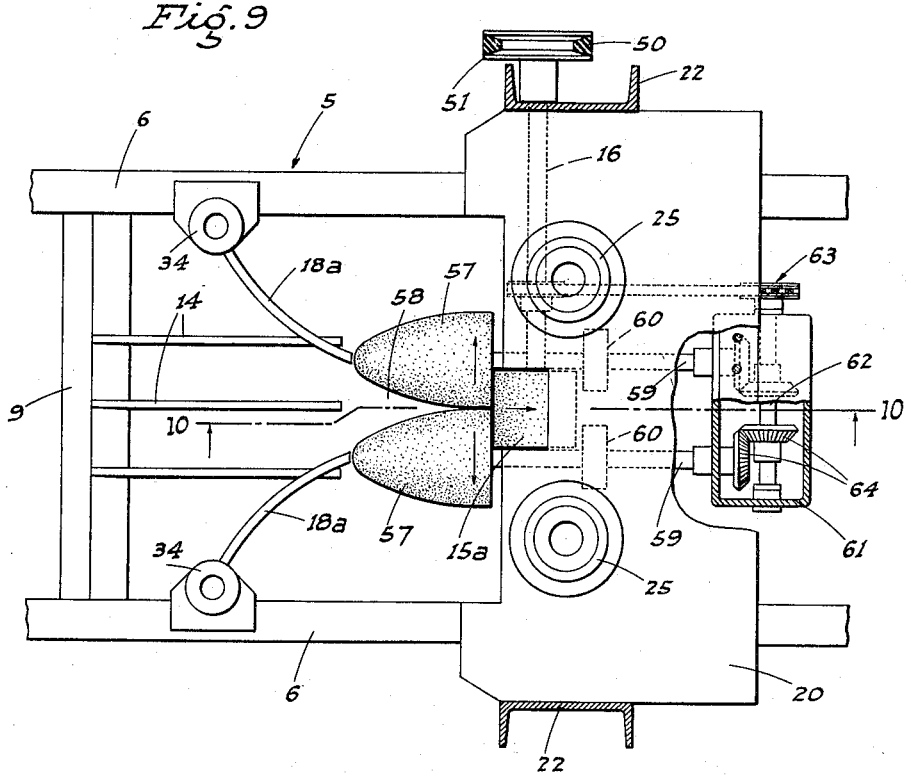
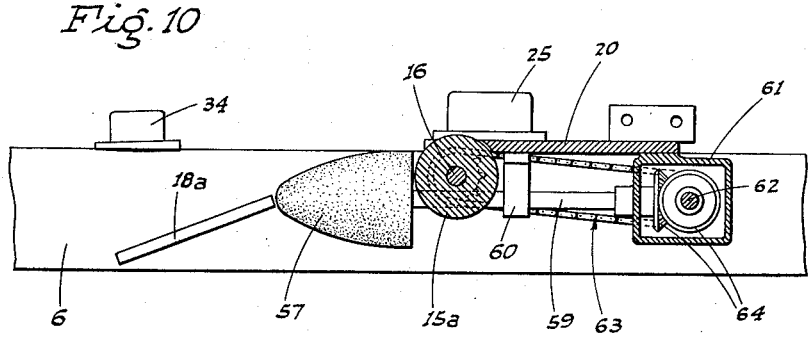
INVENTOR
E. S. Thompson
BY
ATTYS ns Patent Office
2,777,267
Patented Jan. 15, 1957

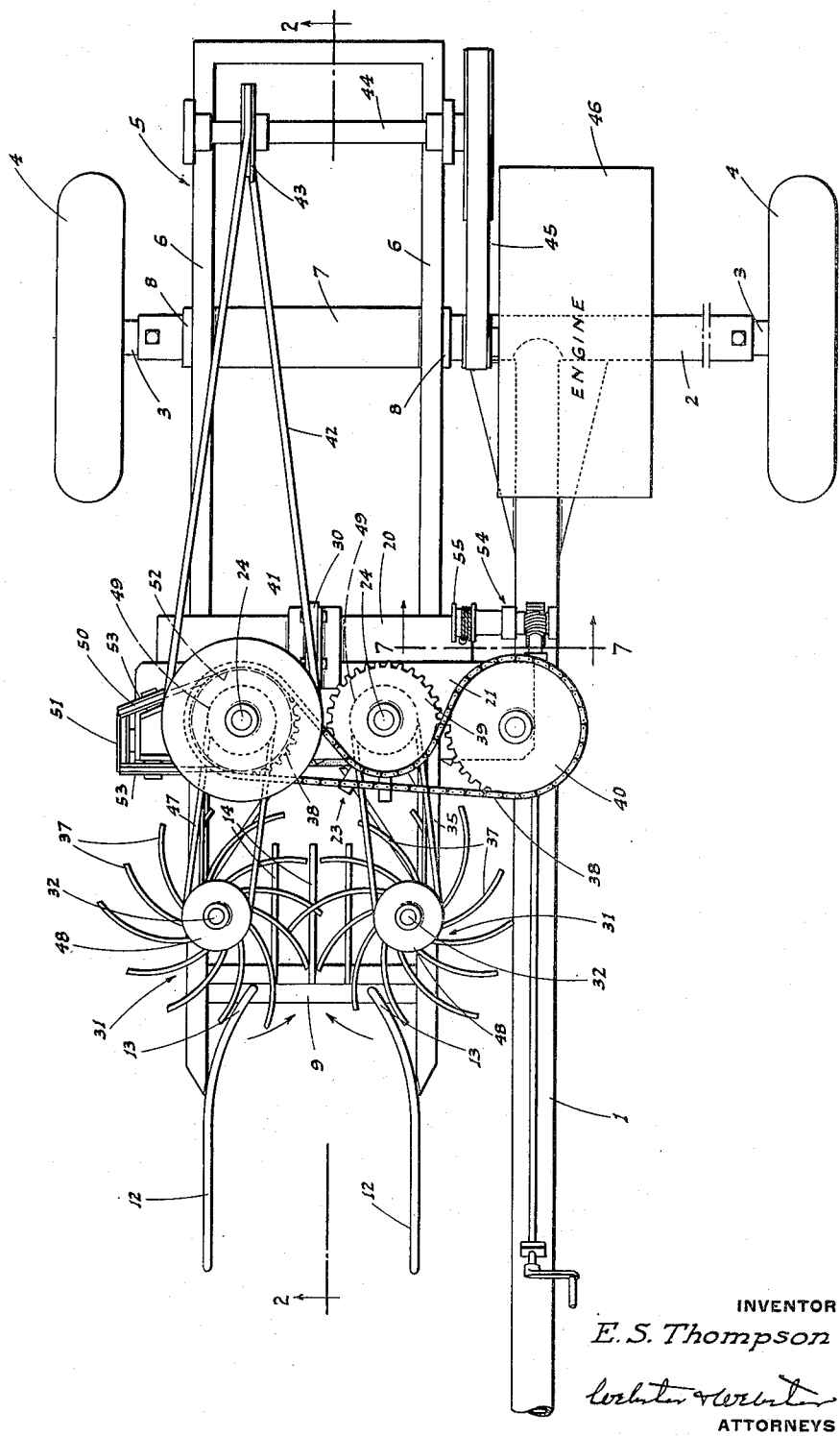

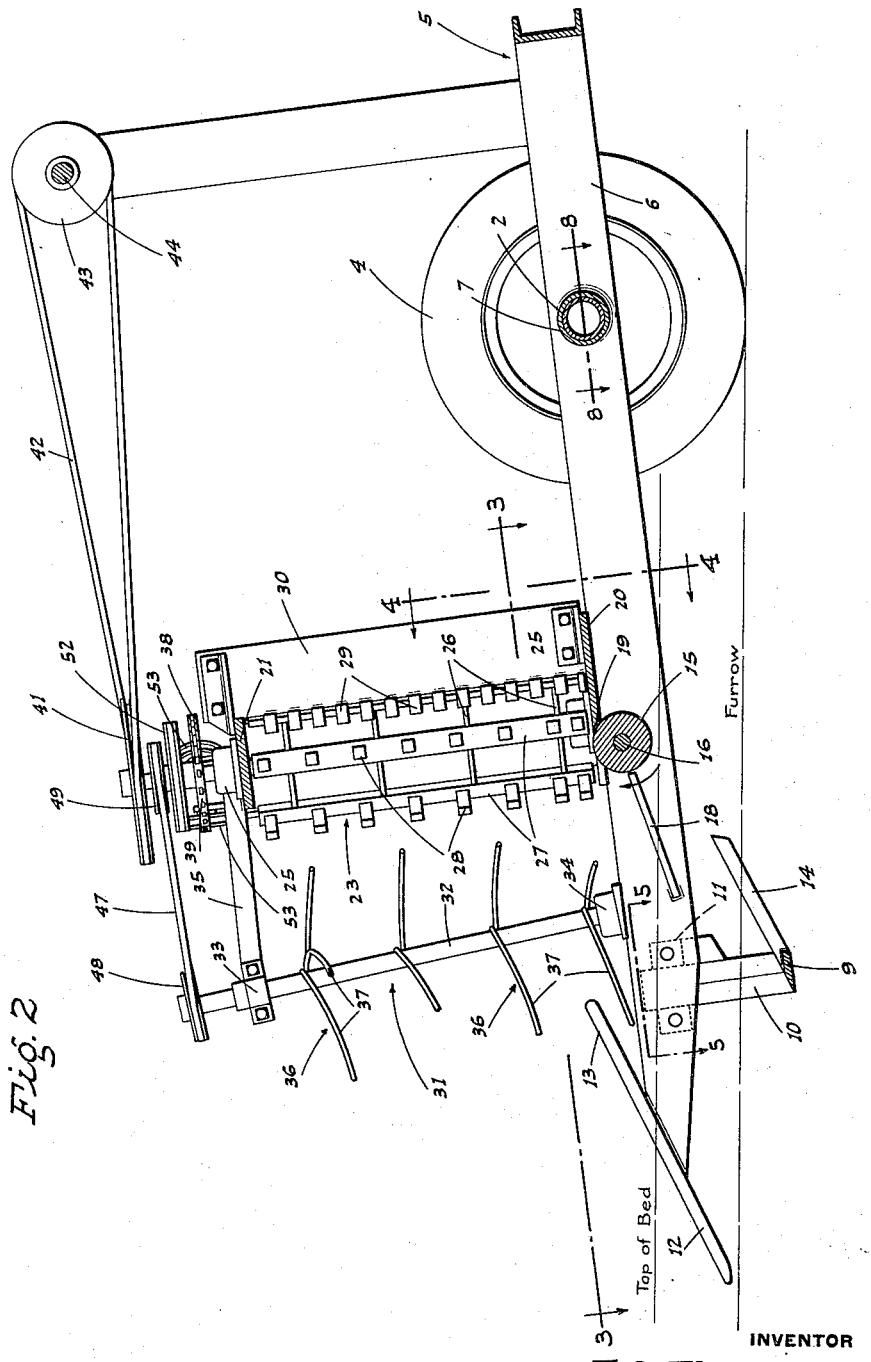

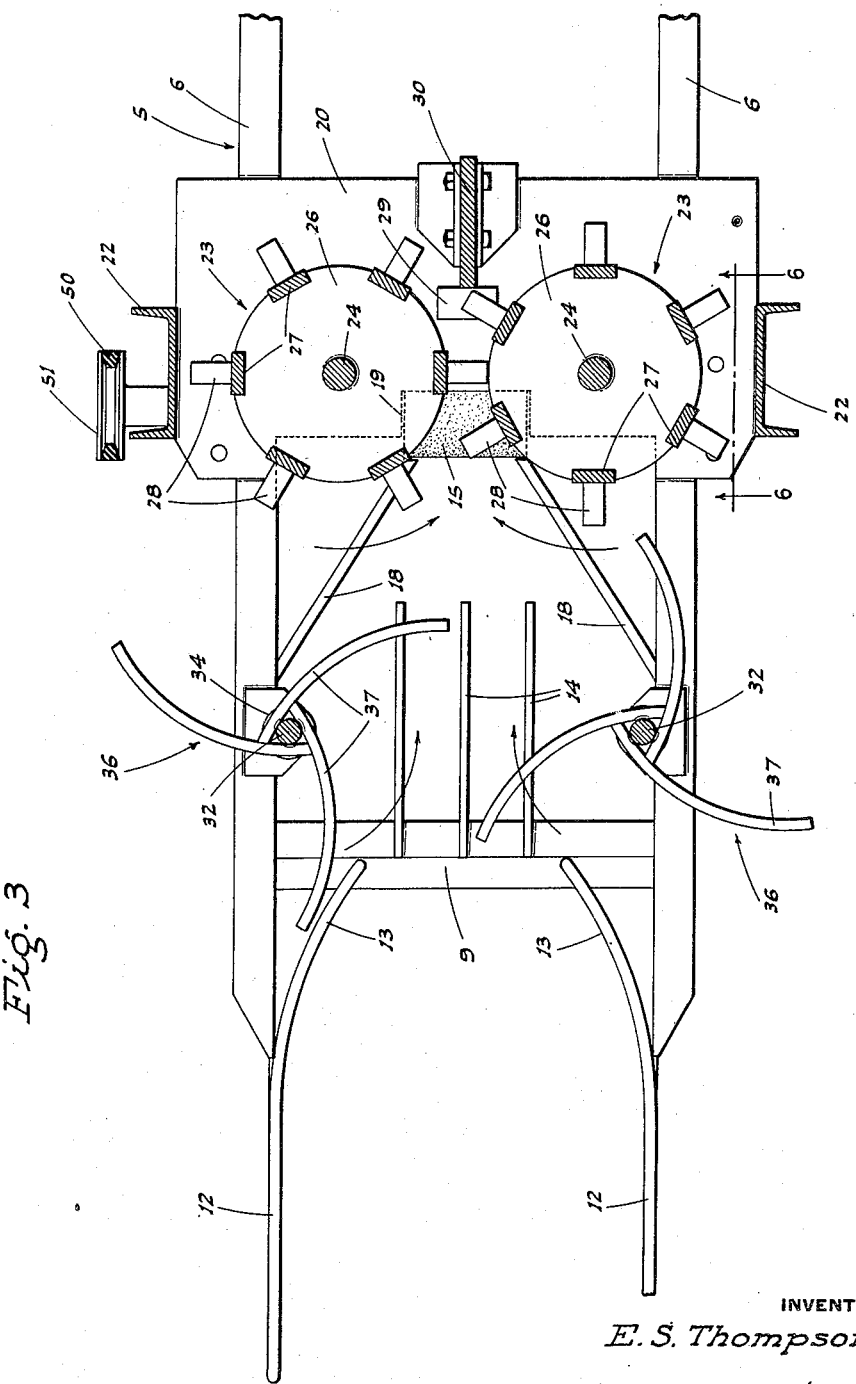

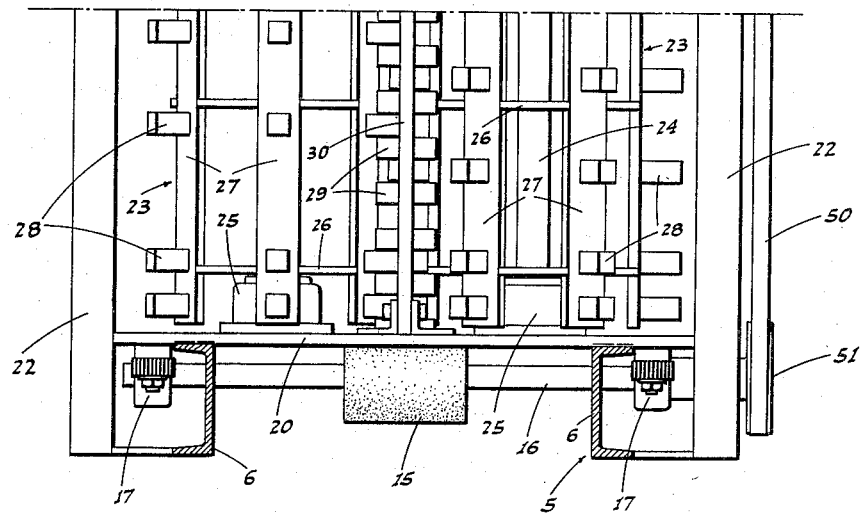
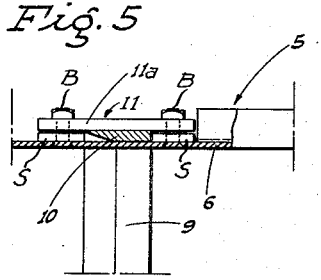
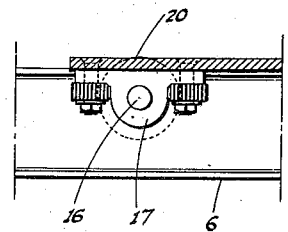
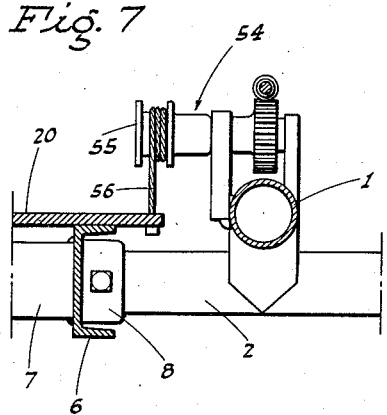
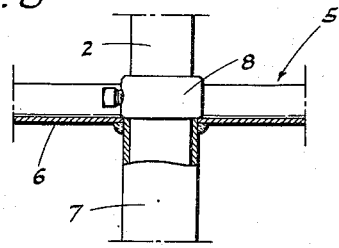

2,777,267

STALK AND ROOT PULLER AND SHREDDER

Ernest S. Thompson, Strathmore, Calif., assignor to said Thompson and Ethel Thompson, as joint tenants Application December 7, 1953, Serial No. 396,682

4 Claims. (Cl. 55—64)

This invention relates to field implements; my major object being to provide an implement adapted to be drawn along and over a row of plants from which the crop has been harvested (such as cotton), and which will uproot the plants and feed them to a shredding mechanism on the implement, which mechanism will then throw the shreds onto the ground in scattered relation and in a finely divided condition for quick decomposition, as is desirable.

The implement includes upstanding plant-shredding cylinders and upstanding top-feeding units to direct the plants to the cylinders; and a further important object of the invention is to provide a plant-stalk pulling device, in the form of a compact multi-roller assembly, which will effectively grip the plant stalks and pull them up as the implement advances.

Another object of the invention is to provide an implement which is practical, reliable, and durable, and one which is exceedingly effective for the purpose for which it is designed.

These objects are accomplished by means of such structure and relative arrangement of parts as will fully appear by a perusal of the following specification and claims.

In the drawings:

Fig. 1 is a top plan view of the implement as built for single-row operation.

Fig. 2 is a sectional elevation of the same, taken on line 2—2 of Fig. 1, with the digging unit lowered to an operating position.

Fig. 3 is a fragmentary sectional plan, enlarged, on line 3—3 of Fig. 2.

Fig. 4 is a fragmentary transverse sectional elevation on line 4—4 of Fig. 2.

Fig. 5 is a fragmentary sectional plan on line 5—5 of Fig. 2.

Fig. 6 is a fragmentary sectional elevation on line 6—6 of Fig. 3.

Fig. 7 is a fragmentary transverse section on line 7—7 of Fig. 1.

Fig. 8 is a fragmentary sectional plan on line 8—8 of Fig. 2.

Fig. 9 is a fragmentary enlarged sectional plan, showing a modified stalk-pulling assembly; the vertical feeder-spiders and shredder cylinders of the implement being removed.

Fig. 10 is a fragmentary longitudinal section on line 10—10 of Fig. 9.

Referring now more particularly to the characters of reference on the drawings, and particularly at present to Figs. 1 to 8, the implement comprises an elongated tongue 1 adapted, at its forward end, for supported draft connection with a tractor, and secured at its rear end on a heavy cross shaft 2 of tubular form. The shaft, at its ends, adjustably supports the extension axles 3 of wheels 4 so that the width may be altered to suit different field conditions.

The frame 5 which carries the root-pulling and plant-shredding mechanism of the implement is disposed to one side of the tongue and includes spaced side beams 6 which, toward the rear end of the frame, support a cross sleeve 7 through which shaft 2 turnably and slidably projects. The position of the sleeve (and frame) on the cross shaft, and relative to the tongue, is determined by adjustable collars 8 on the shaft at the ends of the sleeve (see Figs. 7 and 8). This enables the frame 5 to be properly centered over the raised row or bed to be worked on while the wheels track in furrows to the sides of such row.

Disposed between the beams 6 near the front and some distance below said beams is a transverse blade 9 having side standards 10 adjustably clamped in holding brackets 11 on the beams 6 so that the distance of the blade below the beams may be adjusted or the blade readily removed for servicing when necessary. Each bracket includes locating strips S somewhat thinner than standard 10 and secured on the corresponding beam 6 and between which the standard fits, and a cross strap 11a overlapping said standard and the strips S, and secured to the latter by clamping bolts B as shown in Fig. 5. Elongated lifter fingers 12 project lengthwise of and forwardly from the beams 6 at a downward slope, and terminate at their rear end above the beams and over the blade, and curve laterally inward, as at 13.

Projecting rearwardly and upwardly from the blade 9 are parallel longitudinally extending lifter fingers 14 arranged to direct the stalks, etc. cut by the blade 9 toward a rough surfaced roller 15 fixed centrally between the beams 6 on a shaft 16 journaled in spring or rubber-mounted bearings 17 on beams 6, as shown in Figs. 4 and 6, so that the roller may yield downwardly if required. Laterally converging crowder bars 18 extend laterally in converging relation from the beams 6 rearwardly of blade 9 to the ends of the roller, as shown in Fig. 3.

The roller 15 projects through the front opening 19 in a plate 20 extending over and fixed on beams 6 with the edges of said opening relatively close to the roller. A cross plate 21, some distance above and parallel to plate 20, is supported from said plate and the beams 6 by side uprights 22.

Disposed between the plates are transversely spaced vertical-axis shredder cylinders, indicated generally at 23, and disposed symmetrical to the roller 15. Each cylinder comprises a central shaft 24 journaled in bearings 25 secured on the plates, spaced discs 26 fixed on the shaft, bars 27 parallel to the shaft supported by the discs, and sharp cornered teeth 28 of square section radiating from the bars. The bars of the two cylinders are disposed in circumferentially and mainly vertically staggered or offset relation, as shown in Figs. 3 and 4, and pass closely between rectangular sharp-cornered teeth 29 secured on and projecting from the forward edge of a rigid bar 30 extending between the plates and secured thereto.

This bar is disposed behind the cylinders in symmetrical relation thereto, and forms the equivalent of a concave. The bar 30 and teeth 28 are arranged so that the outer end corners of the teeth 28 pass closely the adjacent vertical corner of the bar, as is clearly evident from Fig. 3.

Upstanding from the beams 6, ahead of the cylinders and centered laterally out from the center of the cylinders and to the rear of blade 9 a short distance, are feeder units indicated generally at 31. Each unit comprises a shaft 32 journaled in top and bottom bearings 33 and 34; bearing 34 being secured on beams 6 while bearing 33 is mounted on an arm 35 projecting forwardly from plate 21. Projecting from the shaft at intervals in the height thereof are feeder spiders 36 each comprising feeder fingers 37 preferably of curved configuration horizontally as shown in Figs. 1 and 3; the fingers of each spider being circumferentially offset or staggered relative to the fingers of the other spiders, as shown in Fig. 1. Also, the fingers of the top spider are preferably somewhat longer than the others so as to improve the lifting action on stalks which may have been leaned forwardly by the tractor ahead or by the weather. Said upper spider is located at a level slightly below the top of cylinders 23.

The cylinders 23 are driven at a relatively high speed and so that their adjacent sides turn toward each other and to the rear by the following means:

A chain 38 is trained over sprockets 39 on shafts 24 and over an idler sprocket 40 supported on plate 21 in such a manner that the direction of rotation of the shafts relative to each other is reversed. A pulley 41 is fixed on one shaft 24 and a belt 42 extends from said pulley to another pulley 43 fixed on a transverse countershaft 44 supported from frame 5. Shaft 44 is driven by a belt drive 45 from an engine, indicated at 46, and mounted on the cross shaft 2, and the adjacent portion of the tongue. Belt drive 45 is arranged so that its efficiency is not materially affected by rotative adjustment of frame 5 on the shaft 2.

Shafts 32 are also driven in opposite directions by individual belts 47 trained about pulley 48 on shaft 32 and pulleys 49 on shafts 24.

Roller 15 is driven so that its forward side turns rearwardly toward the top by means of a belt 50 which passes about a pulley 51 on one end of shaft 16 and a drive pulley 52 on one shaft 24, and over direction changing pulleys 53 mounted on top of plate 21.

Frame 5 may be adjusted up or down relative to the stationary tongue 1 about shaft 2, so as to alter the digging depth of the blade 9, by any suitable means. In the present instance, such means is shown as being a hand-actuated winch 54 mounted on the tongue and including a cable drum 55 overhanging the adjacent end of plate 20 and from which drum cable 56 depends to an anchor on said plate.

In operation, with the frame adjusted so that blade 9 operates at the desired depth in the raised bed or row being worked on, the picker fingers 12, at their forward end, skim along just under the surface of the ground, picking up any downed stalks and lifting them up to the feeder units 37 and at the same time preventing such stalks from possibly clogging the blade 9. As the implement advances, said blade cuts through the tap roots of the plants just at the time the fingers 37 of the feeder units engage the tops of the plants and feeds them to the shredder cylinders 23. These fingers acting in cooperation with the roller 15, the lifter fingers 14, and the crowder bars 18, pull the cut and loosened plants and cause the same to be forced between the high-speed cylinders 23. The teeth 28 of the cylinders grab the plants fed thereto and without too much initial breakage of the plants, force the plants against the stationary teeth 29 of the concave. Due to the close engagement of the cylinder teeth with the teeth and mounting bar 30 of the concave, practically nothing gets past the concave without being well cut, split, and broken up, or well shredded. Due to the momentum given to the shredded pieces by the shredding cylinders, such pieces are then scattered over the ground in condition for quick decomposition.

Since the heaviest portions of the plants naturally pass near the lower plate 20 and the adjacent portions of the cylinder units and concave, the lower rows of teeth thereof are closer together than further up, as shown.

The crowder bars 18 tend to crowd all stalks onto roller 15. Since this roller runs close to the lower portions of the shredder cylinders and concave, it helps pinch the stalks for shredding, and being yieldably mounted, allows the larger stalks to pass between the rollers and cylinders with nearly the same pressure as is exerted on the smaller stalks.

In the modification shown in Figs. 9 and 10, the general assembly and arrangement of parts is the same as above described.

In this modification, however, the pull-up roller 15a is somewhat shorter than roller 15, and projecting ahead of said roller 15a in symmetrical and cooperating relation therewith is a pair of forwardly projecting rollers 57, disposed in close transversely spaced relation. These rollers are of rough-surfaced yieldable rubber, and are shaped with a convergence to their forward end, or are of torpedo-nose or generally conical form, so as to leave a wedge-shaped space 58 therebetween, as shown in Fig. 9. The crowder bars 18a, which are secured to the side frame beams 6 of the implement, terminate at the tips of the rollers 57, so as to deflect all the stalks into said wedge-shaped space 58.

Rollers 57 at their rear end are close to roller 15a, and at the top are intermediate the center and the top of said roller 15a, as shown in Fig. 10.

The rollers 57 are mounted and driven in coordinated relation with roller 15a, so that the rollers 57 turn away from each other at the top, as indicated, by suitable means. As here shown, such means comprises horizontal shafts 59 projecting rearwardly from rollers 57 alongside roller 15a and under the driven shaft 16 thereof. Shafts 59 are journaled in bearing members 60 depending from the platform 20 which supports the shredding mechanism, and in a transverse gear box 61 secured to and disposed under said platform.

Journaled in the gear box is a transverse shaft 62 driven in the same direction as roller shaft 16 by a chain drive unit 63. Bevel gear units 64 in the gear box between shaft 62 and shafts 59 drive the latter in the desired opposed direction; the gearing and chain drive being arranged so that the roller 15a and rollers 57 will turn at the same speed.

By reason of the specific roller arrangement defined, a very efficient stalk-pulling action is obtained, particularly in down cotton or other crops, since the stalks will be gripped in the three-way or triangular trap formed between the three coordinated rollers, and the plants will be positively pulled up. These rollers, therefore, together with the plant-top feeding spiders and shredding cylinders, form a combination by which plants will be both pulled and shredded in a very efficient manner.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A plant pulling and shredding implement comprising a frame adapted to be pulled along a field over a row of plants to be pulled, a blade below and supported by the frame to cut through the roots of the plants, a pair of cooperating shredding cylinders upstanding from the frame rearwardly of the blade in position to receive cut plants therebetween and arranged to be driven so that their adjacent sides turn rearwardly, the cylinders including rows of radial teeth to engage and feed the plants rearwardly, a relatively stationary concave upstanding from the frame rearwardly of the cylinders in a transverse plane centrally therebetween and including forwardly projecting teeth to cooperate in plant shredding relation with the cylinder teeth; a transverse plate on the frame directly below the cylinders, a rough surfaced roller disposed in a transverse plane between the cylinders and recessed into the front of the plate with its top adjacent the level of the plate, means to guide the plants as cut by the blade toward the roller for engagement thereby, and means to drive the roller so that its forward side moves upwardly.

2. A structure as in claim 1, in which the frame includes transversely spaced side beams and the plant guide means includes crowder bars secured against the beams above and rearwardly of the blade and extending thence in rearwardly converging relation to a termination adjacent the forward side of the roller at the ends thereof.

3. A structure as in claim 1, including a shaft for the roller, and downwardly yieldable bearings in which the shaft is journaled.

4. A plant pulling and shredding implement comprising a frame adapted to be pulled along a field over a row of plants to be pulled, a blade below and supported by the frame to cut through the roots of the plants, a plant shredding mechanism mounted on the frame rearwardly of and above the blade, and means mounted on the implement in position between the blade and the shredding mechanism to pull stalks of the cut plants and direct the same toward said mechanism; said means comprising a transverse friction roller, a pair of longitudinally disposed yieldable rollers extending forwardly from the transverse roller in close relation thereto and to each other, said pair of rollers being of generally conical form with their apices facing forwardly, and means to drive all said rollers in unison and so that the upper face of the transverse roller turns rearwardly and the pair of rollers turn away from each other at the top; the top level of the transverse roller being adjacent but above that of the yieldable rollers at their rear end.

References Cited in the file of this patent

UNITED STATES PATENTS

| | | |
|---|---|---|
| 1,524,118 | Turnage | Jan. 27, 1925 |
| 2,188,522 | Alfs | Jan. 30, 1940 |
| 2,429,492 | Scranton | Oct. 21, 1947 |
| 2,530,466 | Heimark | Nov. 21, 1950 |
| 2,544,023 | Johnson | Mar. 6, 1951 |
| 2,648,942 | Grant et al. | Aug. 18, 1953 |

FOREIGN PATENTS

| | | |
|---|---|---|
| 137,506 | Australia | June 5, 1950 |